(12) United States Patent
Kurtev et al.

(10) Patent No.: US 11,379,204 B2
(45) Date of Patent: Jul. 5, 2022

(54) STAGING SERVICE

(71) Applicant: SAP SE, Walldorf (DE)

(72) Inventors: Deyan Mitkov Kurtev, Kozloduy (BG); Hristo Dimitrov Ginev, Burgas (BG); Emil Dimitrov Genchev, Sofia (BG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/895,118

(22) Filed: Jun. 8, 2020

(65) Prior Publication Data

US 2021/0382703 A1  Dec. 9, 2021

(51) Int. Cl.
| | | |
|---|---|---|
| *G06F 9/44* | (2018.01) | |
| *G06F 9/445* | (2018.01) | |
| *G06F 9/455* | (2018.01) | |
| *G06F 8/60* | (2018.01) | |
| *G06F 8/30* | (2018.01) | |
| *G06F 11/36* | (2006.01) | |
| *G06F 8/41* | (2018.01) | |

(52) U.S. Cl.
CPC .............. *G06F 8/60* (2013.01); *G06F 8/30* (2013.01); *G06F 8/44* (2013.01); *G06F 11/3664* (2013.01); *G06F 11/3688* (2013.01); *G06F 11/3692* (2013.01)

(58) Field of Classification Search
CPC ..... G06F 8/60; G06F 8/30; G06F 8/44; G06F 11/3664; G06F 11/3688; G06F 11/3692
See application file for complete search history.

(56) References Cited

U.S. PATENT DOCUMENTS

| | | | | |
|---|---|---|---|---|
| 7,739,680 B1* | 6/2010 | Thakur | .................. | G06F 8/656 |
| | | | | 717/172 |
| 10,318,285 B1* | 6/2019 | Jodoin | ................ | G06F 11/3688 |
| 10,564,961 B1* | 2/2020 | Braun | ..................... | H04L 67/10 |
| 10,684,941 B2* | 6/2020 | Adibowo | .................. | G06F 8/65 |

(Continued)

OTHER PUBLICATIONS

Amazon, Practicing Continuous Integration and Continuous Delivery on AWS, 2017, pp. 1-36. https://d0.awsstatic.com/whitepapers/DevOps/practicing-continuous-integration-continuous-delivery-on-AWS.pdf (Year: 2017).*

(Continued)

*Primary Examiner* — Mongbao Nguyen
(74) *Attorney, Agent, or Firm* — Fish & Richardson P.C.

(57) ABSTRACT

Computer-implemented methods, software, and systems for managing deployed artifacts at designated landscapes during test execution to provide successful delivery to a production environment are provided. In response to an indication of a successful build of submitted source code at a build tool, a staging service is invoked. Staging repositories are created for storing artifacts generated as a result of the successful build. A profile is configured for the staging repositories to manage processing of the artifacts. The artifacts in the staging repositories are uploaded according to the configured profile and are provided from the staging repositories for execution at a designated landscape. Metadata from the execution that is associated with performance of the artifacts at the designated landscape is received. In response to evaluation of the metadata, determining whether to release the artifacts from the plurality of staging repository to one or more target repositories.

19 Claims, 7 Drawing Sheets

(56) References Cited

U.S. PATENT DOCUMENTS

| | | | | |
|---|---|---|---|---|
| 10,809,992 | B1* | 10/2020 | Kondo | G06F 8/60 |
| 11,048,491 | B1* | 6/2021 | Davies | G06F 11/3664 |
| 2013/0174124 | A1* | 7/2013 | Watters | G06F 8/71 |
| | | | | 717/122 |
| 2017/0372247 | A1* | 12/2017 | Tauber | G06F 11/3668 |
| 2018/0091624 | A1* | 3/2018 | Forbes | G06F 8/60 |
| 2018/0113684 | A1* | 4/2018 | Dawson | G06F 8/36 |
| 2018/0173510 | A1* | 6/2018 | Koshkin | G06Q 10/06313 |
| 2019/0149604 | A1* | 5/2019 | Jahr | H04L 67/34 |
| | | | | 713/175 |
| 2020/0057633 | A1* | 2/2020 | Topiwala | G06F 8/433 |
| 2020/0104107 | A1* | 4/2020 | Hodder | G06F 8/71 |
| 2020/0117434 | A1* | 4/2020 | Biskup | G06F 8/71 |
| 2020/0133651 | A1* | 4/2020 | Holzer | G06F 8/33 |
| 2020/0142809 | A1* | 5/2020 | Adibowo | G06F 8/71 |
| 2020/0252307 | A1* | 8/2020 | Miedema | H04L 67/42 |
| 2020/0387357 | A1* | 12/2020 | Mathon | G06F 9/5077 |
| 2021/0157560 | A1* | 5/2021 | Orozco | G06F 11/3688 |

OTHER PUBLICATIONS

Panagiotis Patros, Dynamically Compiled Artifact Sharing for Clouds, 2017, pp. 290-299. https://ieeexplore.ieee.org/document/8048940?source=IQplus (Year: 2017).*

Ligia Georgeta Guseila, DevOps Transformation for Multi-Cloud IoT Applications, 2019, pp. 1-6. https://ieeexplore.ieee.org/stamp/stamp.jsp?tp=&arnumber=9043730 (Year: 2019).*

Help.sonatype.com[Online], "Staging Overview" Apr. 19, 2020, [retrieved on Jun. 8, 2020], retrieved from: URL <https://help.sonatype.com/repomanager2/staging-releases/staging-overview>, 3 pages.

Help.sonatype.com[Online], "Staging" Jun. 28, 2018, [retrieved on Jun. 8, 2020], retrieved from: URL <https://help.sonatype.com/repomanager3/staging#app>, 6 pages.

Jfrog.com[Online], "Search-based Promotion—Staging and Promotion Finally Made Simple" Nov. 5, 2009, [retrieved on Jun. 8, 2020] retrieved from: URL <https://jfrog.com/blog/search-based-promotion/>, 5 pages.

* cited by examiner

STAGING SERVICE

TECHNICAL FIELD

The present disclosure relates to computer-implemented methods, software, and systems for deployment management of software products in a platform environment.

BACKGROUND

Software applicants may execute processes in relation to providing services that may be consumed by other software applications or services, or may be directly exposed to end user. For example, during software development processes, changes to software source code are made when working on a new version of a software application or a service. Changes submitted to existing source code may be developed, submitted for compilation, and executed in a test environment to evaluation performance of the software.

In enterprise software development, a platform landscape can include different software applications and services that are distributed across multiple nodes, tenants, or physical machines. When a new version of a software application is released, the complete landscape may need to be evaluated, for example, through execution of integration tests. Complexity may be introduced in the deployments, particularly if there are additional configurations for security and authentications. With cloud computing, and especially with the Software-as-a-Service (SaaS) form of cloud computing, the complexity of managing software development lifecycle may be associated with complex tasks for software testing to determine whether new software versions are ready for release in production landscapes.

SUMMARY

The present disclosure involves systems, software, and computer implemented methods for creating staging repositories for managing deployed artifacts at designated landscapes during test execution to provide successful delivery to a production environment.

One example method may include operations such as invoking, in response to an indication of a successful build of submitted source code at a build tool, a staging service to create a plurality of staging repositories for storing artifacts generated as a result of the successful build of the source code, wherein a profile is configured for the plurality of staging repositories to manage processing of the artifacts; uploading the artifacts in the plurality of staging repositories according to the configured profile; providing the artifacts from the plurality of staging repositories for execution at a designated landscape; receiving metadata from the execution, wherein the metadata is associated with performance of the artifacts at the designated landscape; and in response to evaluation of the metadata, determining whether to release the artifacts from the plurality of staging repository to one or more target repositories. Other implementations of this aspect include corresponding systems, apparatus, and computer programs, configured to perform the actions of the methods, encoded on computer storage devices.

Implementations can optionally include in response to releasing the artifacts to the one or more target repositories, deploying the artifacts to a production landscape.

In some instances, receiving, at a compiler, changes submitted for the source code, wherein the source code with the changes is submitted for compiling, wherein the source code and the changes are associated with a version of a software application; and building, at the built tool, the compiled source code with the changes for the software application to generate the artifacts and to provide the indication of the successful build.

In some instances, the plurality of staging repositories are correspondingly associated with different deployment management technologies.

In some instances, configuring a staging group based on the profile; and assigning the plurality of staging repositories to the staging group to define corresponding deployment management technologies associated with the plurality of staging repositories.

In some instances, after uploading the artifacts at the plurality of staging repositories, locking the plurality of staging repositories in the staging group for read-only operations; and executing checks for the artifacts to determine integrity of content of the artifacts according to predefined actions associated with the configured profile.

In some instances, instantiating the staging service to create the plurality of staging repositories as temporary repositories for storing the artifacts.

In some instances, instantiating the staging service comprises based on exposed service functionality through a staging interface of the staging service, receiving a profile definition for the profile to be configured for the plurality of staging repositories.

In some instances, releasing the artifacts from the staging repositories to the one or more target repositories, wherein a quantity of target repositories is defined in the configured profile, and wherein a first staging repository from the staging repositories is defined for release into a plurality of target repositories.

It can be appreciated that the described instances of the present disclosure can be combined in different variations to cover two or more different aspects from different instances in one implementation.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and embodiments of the present disclosure are set forth in the accompanying drawings and the description below. Other features, objects, and advantages of the disclosure will be apparent from the description, drawings, and the claims.

DETAILED DESCRIPTION

Figure 1A:
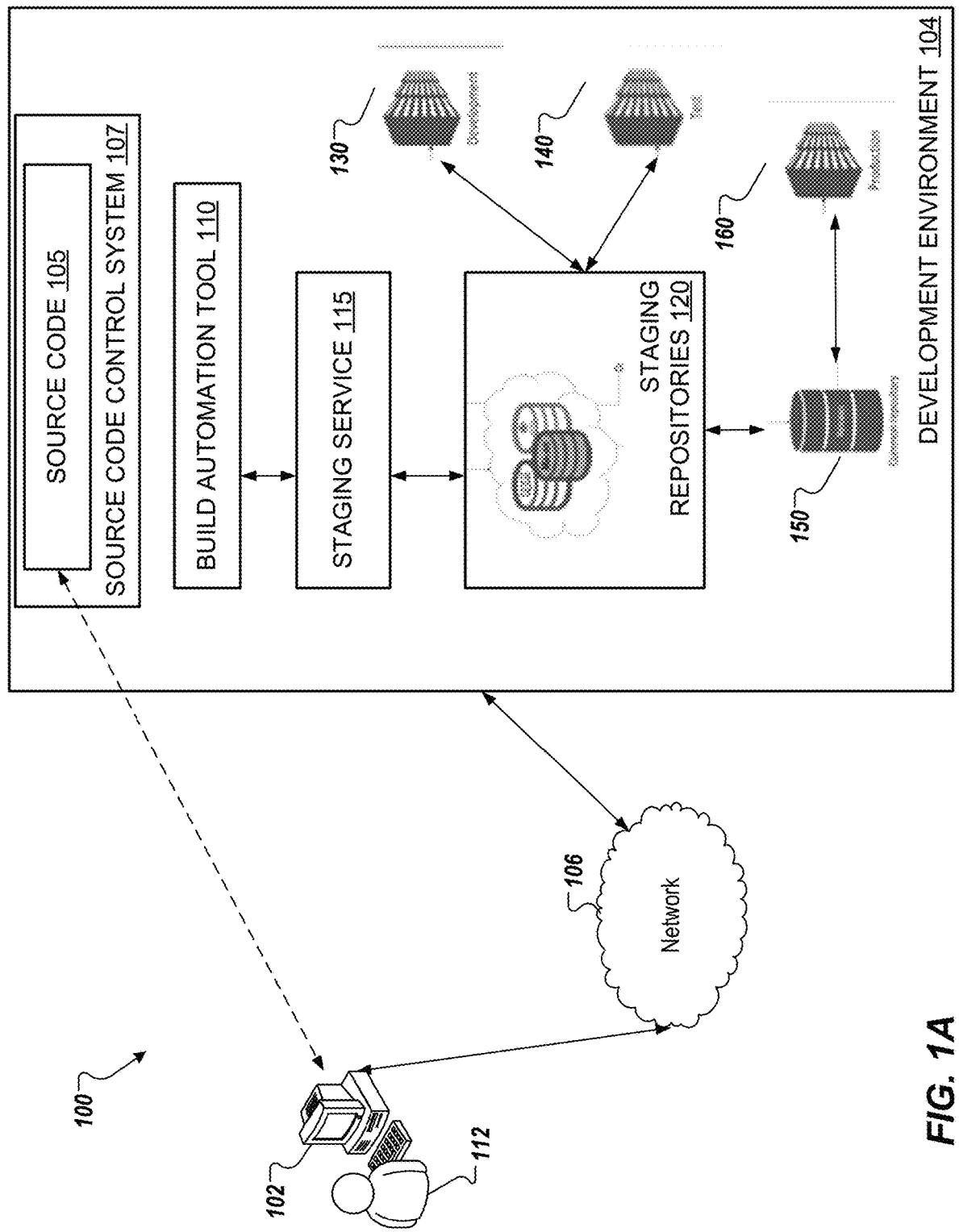
FIG. 1A illustrates an example computer system architecture that can be used to execute implementations of the present disclosure.

The present disclosure describes various tools and techniques for creating staging repositories for managing deployed artifacts at designated landscapes during test execution to provide successful delivery to a production environment.

Software development lifecycle includes multiple stages including development, deployment, testing, release, update, and upgrade, among others. These stages may be associated with different requirements and constraints that are imposed by the process and/or by the infrastructure defined for the software execution. There may be different tools and techniques that can be used during the different lifecycle stages.

In some instances, a software application is developed and released for productive use, where the software application is running at a production environment and is coupled with other software applications and services. Software applications and services running in a given production environment may be associated with different technology restrictions and different frameworks. A given software application may be provided by a software provider and can be directed to different customer environments, including different runtime set-up and supporting different technologies and frameworks for software development and execution.

In some instances, developers generate source code in relation to different software application components and submit such source code into source code repositories that have a structural organization. Software developers utilize different development tools to maintain and manage the source code generation and distribution. Different versions of the source code can be maintained at different repositories provided by the development infrastructure. The different repositories may have a particular organization for maintaining different portions of the source code and/or may correspond to different use cases. For example, source code submitted for one component may be compiled and stored in a first repository for test purposes. In some other examples, source code that has been evaluated and tested can be uploaded (or pushed, published) to a second repository that is related to a product release repository. The product release repository may be associated with a particular customer, customer account, or a group of customers.

In some instances, when a developer uploads (or publishes) a component to a hosted repository, such as a release repository, the component is published and immediately made available for consumption by end users in productive mode. When a component is deployed in such a productive landscape, the component is running without any oversight from a developer or tester to evaluate component's performance. In some instances, as the component is running in a productive scenario in the hosted repository, test cases cannot be executed on top of the running component, such as to determine performance of the execution. In such cases, if there is an issue with the released component in productive mode, a new updated version of the component may be provided and deployed again to replace the previous one.

In some other instances, one component may be designed and developed for multiple destinations in relation to multiple customers. In such cases, the component has to be uploaded at different destination repositories, where these repositories may be at different locations and/or different infrastructure environments. Such distribution process may be a tedious task that requires promotion of built artifacts evaluated as ready for productive use to multiple target repositories provisioned at different physical locations to support a defined performance level of services provided from software execution in response to requests incoming from different locations.

In some instances, the deployment management of software components can be organized to automatically stage candidates to a temporary repository that can then be used to test and certify a set of components, such as before they are published to a final target repository. It may be configured whether the staged artifacts from a staging repository are to be promoted to a release repository or to a production repository. The release repository may be a repository set up at an external landscape to the software provided of the built artifacts. The production repository may be a repository instantiated within the environment of the software provider, and the deployed artifacts from a production repository may be executed in that environment and serve external requests. In some instances, the release repository and the production repository may be configured with different sets of authorization parameters, as they are executing at different landscape having different requirements.

In some instances, when new components are built, staging repositories can be created on the fly, and built artifacts can be published in the created staging repositories. The built artifacts can be published using standard tools or platforms for managing application delivery. For example, different binary management system may be used for maintaining instances of repositories for storing binary artifacts. Further, different technologies for build management of software artifacts can be used in relation to a given software product release, such as MAVEN, NPM, and DOCKER.

In some instances, as product development is associated with complex product releases and different technologies and requirements, software components may be associated with different technologies relevant for generating a build and managing the build process. By submitting source code related to different technologies for build execution, multiple staging repositories may be created. The staging repositories may be associated with the different technologies relevant to the product release. By initiating the build execution, the artifacts may be generated and pushed for storage into the different staging repositories where checks can be performed for the content (built artifacts stored in the repositories), before the content is released to a release repository for productive use.

In some instances, staging profiles can be configured to define the workflow for managing the built artifacts in a particular sequence corresponding to a defined software development lifecycle.

In some instances, a staging service can be instantiated and an application programming interface (API) of the staging service can be exposed. Such an API can be invoked when source code, or changes to source code, are submitted and software components are built. Built software components include multiple artifacts that can be pushed and stored at staging repositories that are created by the staging service. The staging service may provide one or more temporary repositories that can be used to store artifacts. When a software delivery tool is triggered for delivery of newly submitted source code, the staging service can be automatically invoked to create a set of staging repositories. The staging repositories may be associated with different technologies for managing delivery of artifacts. For example, each of the staging repositories can be associated with a different technology, such as, MAVEN, NPM, DOCKER, etc.

In some instances, after the artifacts are uploaded at the staging repositories, they can be executed at different landscapes, and at which the artifacts can be tested. Also, there may be other validation operations that can be performed on the artifacts at the staging repositories. If defined set of tests are passed (e.g., the artifacts are executed successfully), the artifacts can then be promoted from a staging repository to a common target repository. For example, the common target repository may be a release-quality repository. In such case, the common target repository is released to the release-quality repository.

FIG. 1A depicts an example architecture 100 in accordance with implementations of the present disclosure. In the depicted example, the example architecture 100 includes a client device 102, a network 106, and a development environment 104. The development environment 104 may include one or more server devices and databases (e.g., processors, memory). In the depicted example, a user 112 interacts with the client device 102 and may communicate with the development environment 104 via the network 106.

In some instances, the development environment 104 may provide hardware and/or software resources utilized during software development process lifecycle, including for example, design and development phases of software products, testing, updating and upgrading, and maintenance during execution at productive landscapes.

In some examples, the client device 102 can communicate with the development system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices, and server systems.

In some implementations, the development environment 104 includes at least one server and at least one data store.

In the example of FIG. 1A, the development environment 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the development system 104 can host a source code control system 107 where software code can be submitted and maintained, and where versions of components can be organized and controlled. For example, source code 105 may be submitted in the source code control system 107 in relation to a first software application component. In some instances, the source code 105 may be a change provided to pre-existing source code that is already maintained in the source code control system 107.

In some instances, when the source code 105 is submitted, for example, by the user 112 who is a developer for the software application component, a build automation tool 110 can be invoked. The build automation tool 110 can be invoked automatically, such as based on the code submission, or may be manually triggered. The build automation tool 110 may pull the source code 105 (and/or the changes) and compile the source code 105 and generate binary artifacts as a result from the build. After the binary artifacts are generated, staging repository 120 may store the binary artifacts. The staging repositories 120 may be created by a staging service 115 that is instantiated at the development environment 104 and may be invoked through a provided staging API exposed by the staging service 115. The built artifacts from the build automation tool 110 can be uploaded to the staging repositories. In some examples, multiple staging repositories are correspondingly populated with the built artifacts, where each of the staging repositories may be associated with a different evaluation scenario and with a different technology. In this way, the built artifacts may be evaluated through the temporary staging repositories when running in different landscapes.

In some instances, after the staged content (i.e., the built artifacts) is provided to the different staging repositories, the content from each of the staging repositories may be distributed to different execution landscapes, for example, to a development landscape 130 and to a test landscape 140. At the different landscapes—the development landscape 130 and the test landscape 140—the built artifacts can be tested with different test case scenarios and evaluated according to different criteria. If tests executed at the corresponding landscape have passed, it may be appreciated that the new content submitted through the source code 105 submission is valid and complies with defined criteria for code release in the corresponding productive environments. Based on test result evaluation, the artifacts from the corresponding staging repositories may be determined whether to be promoted to a common repository 150. The common repository 150 may be configured in the staging service 115 as a target repository for promoting built artifacts that pass successful evaluation. Based on the artifacts being promoted to the common repository 150, the newly built artifacts based on the source code 105 may be provided to a production 160 landscape. For example, in the production landscape 160, the new artifacts can update a previous version of the software application component corresponding to the submitted source code 105. Additionally, as the built artifacts are stored as multiple instances in the multiple staging repositories 120, and each of the repositories is used for test evaluation, the common repository 150 may include multiple instances of the built artifacts, where these versions can be released to different production landscapes.

Figure 1B:
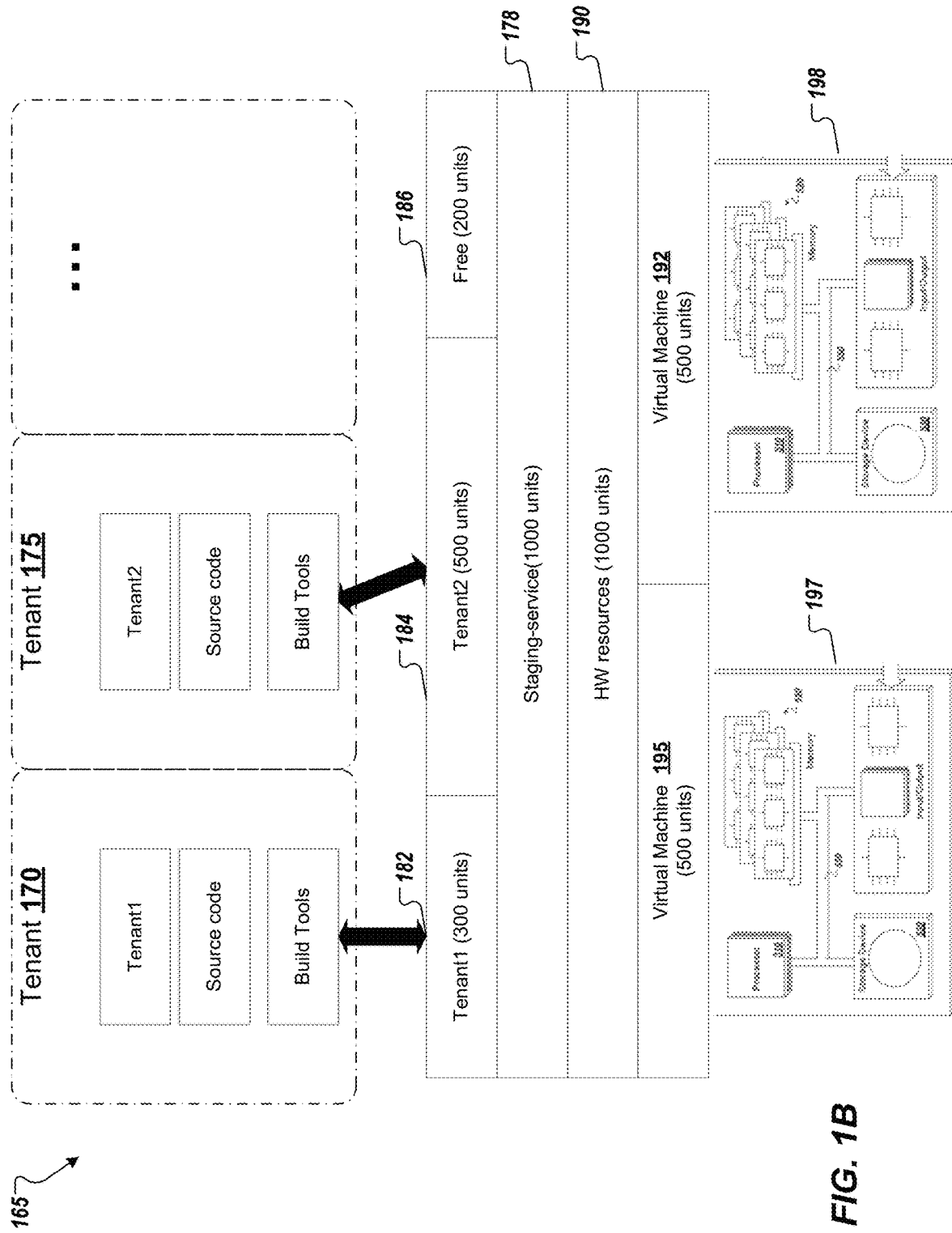
FIG. 1B illustrates an example computer system architecture that can be used to executed a staging service that provides operations in relation to different tenants using a common set of computing resources in accordance with implementations of the present disclosure.

FIG. 1B illustrates an example computer system architecture 165 that can be used to execute a staging service 178 that provides operations in relation to different tenants using a common set of computing resources in accordance with implementations of the present disclosure.

In some instances, a staging service may be implemented to execute on hardware resources 190. The hardware resources 190 may provide computing capabilities and power that may correspond to a certain amount (e.g., abstract units). The provided capabilities by the hardware resources 190 may be consumed by the staging service 178 in relation to multiple clients associated with different tenants.

In some instances, the staging service 178 may be similar to the staging service 115 of FIG. 1A. The staging service 178 may receive requests in relation to built artifacts from build tools where source code in relation to different software projects is provided in the context of a different tenant.

In some instances, the staging service 178 may be instantiated to serve requests for staging functionality in relation to a number of tenants including tenant 170 and tenant 175. When the staging service 178 receives a request for executing a staging workflow in relation to built artifacts, the staging service 178 performs authorization on the received request to identify the tenant who is associated with the request and to determine whether this is a valid request for the staging service and how to process the request.

In some instances, the staging service 178 may utilize hardware resources and provided capacity that is divided and/or split in a particular quota in relation to the different tenants authorized to use the staging service.

The staging service 178 may receive requests from multiple tenants, such as tenant 170 and tenant 175. The two tenants may be associated with different clients having different software code in relation to different solutions. For example, tenant 170 may correspond to the development environment 104 of FIG. 1A, and the staging service 178 may serve multiple requests for staging services from different built tools, such as the build automation tool 110.

When the staging service 178 receives a request in relation to a tenant, such as tenant 170, the staging service 178 determines the hardware resources allocated to that tenant 170 and utilizes those to instantiate the staging repositories and to perform a staging workflow at different landscapes for execution and evaluation. The execution of a staging workflow may be similar to the discussed operations in relation to the staging service 115.

The tenants authorized to use the staging service 178 may be associated with allocated units of resources. For example, tenant 170 may be associated with Tenant1 182 resources that correspond to 300 units from the 1000 units of hardware resources allocated to the staging service 178. Further, tenant 174 may be associated with Tenant2 184 resources that correspond to 500 units from the 1000 units of hardware resources allocated to the staging service 178. Further, the resources 190 for the staging service 178 may also include free resources 186 that are not yet allocated for a tenant that is associated with the staging service. For example, if a third tenant requests staging services from the staging service 178, resources from the free resources 186 may be allocated to that new requesting tenant.

Figure 5:
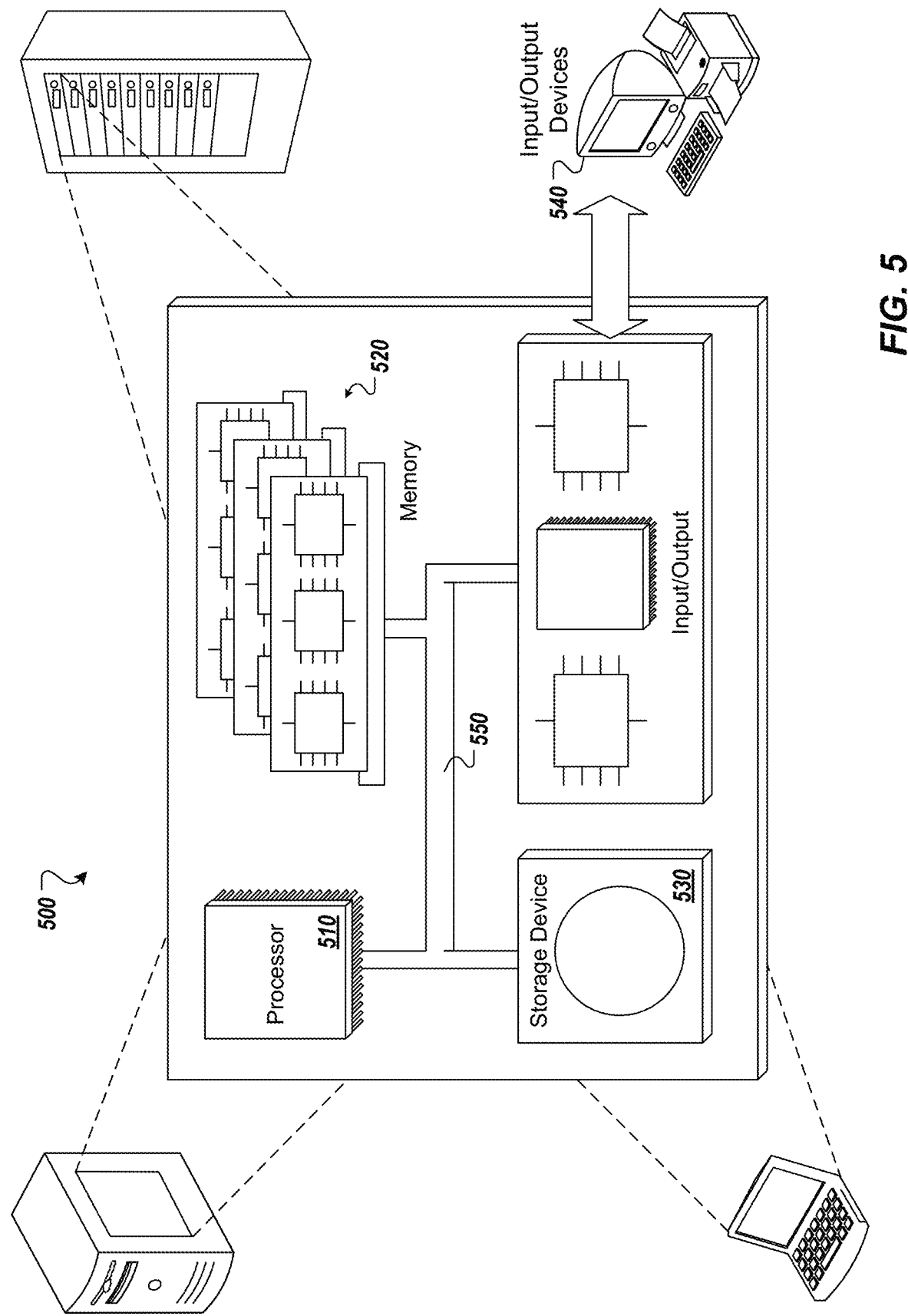
FIG. 5 is a schematic illustration of example computer systems that can be used to execute implementations of the present disclosure.

In some instances, the hardware resources 190 may be cloud resources that are virtualized and may be provided by two virtual machines—virtual machine 195 and virtual machine 192, which can handle the load and provide resources of the capacity required by the staging service 178, i.e. 100 units. The virtual machines may provide equal amount of resources and there may be a different number of virtual machines that can support the staging service 178 and provide hardware resources. The virtual machines 195 and 192 may be executing on top of computing systems 197 and 198. The computing systems 187 and 198 may be similar to the computing system 500 of FIG. 5.

In some instances, by providing such a computer architecture 165, multitenancy is provided by the staging service 178. In those cases, a single instance of the staging service is running and serves multiple tenants in a shared manner while maintaining data isolation. A tenant may include multiple users who share a common access to the functionality provided by the staging service. The staging service 178 thus provides every tenant a dedicated share of the instance, including data, configurations, user management, and functionality, among others.

In accordance with implementations of the present disclosure, the computer architecture 165 supports distributed deployment that may scale a large number of staging repositories as the hardware resources are distributed in a multi-cloud computing manner across several cloud-hosting environments. A multi-cloud architecture utilized cloud infrastructure, such as two or more public clouds, or private clouds, where the cloud computing infrastructure may be provided by different cloud providers and/or vendors. The allocation of cloud computing resources may be allocated dynamically in response to demand from the staging service. By providing multiple virtual machines, such as virtual machine 195 and virtual machine 192, to support the load of a staging service that handles requests for staging services from different tenants having different requirements and process workflows, horizontal scalability is provided. Thus, to support higher load in terms of requests requiring more computing power, a single instance of the staging service 178 may consume more cloud computing resources that can be provided by the multi-cloud setup.

Figure 2A:
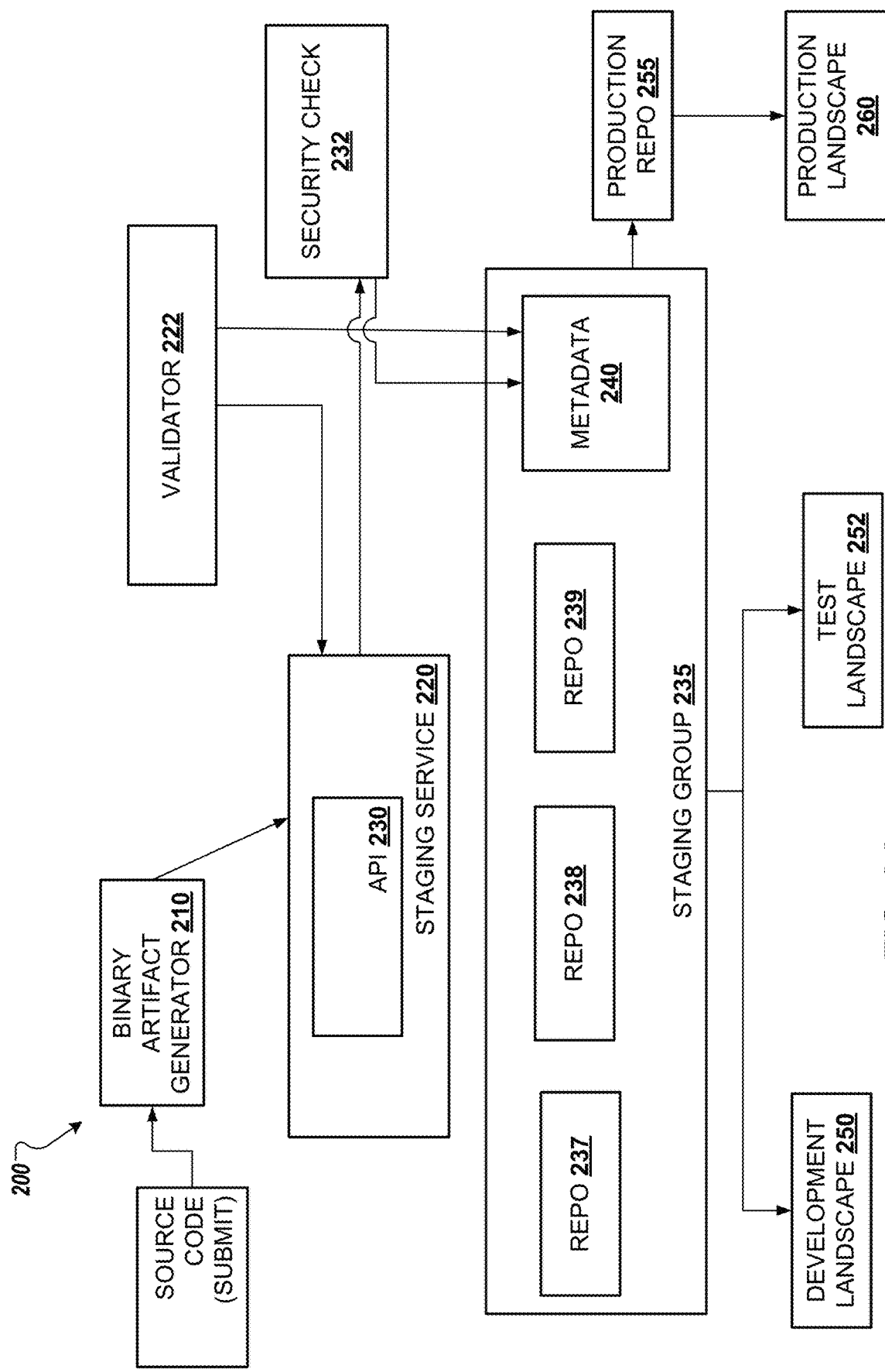
FIG. 2A is a block diagram for an example system for uploading artifacts at staging repositories created by a staging service in accordance with implementations of the present disclosure.

FIG. 2A is a block diagram for an example system 200 for uploading artifacts at staging repositories created by a staging service in accordance with implementations of the present disclosure. The example system 200 may be running at a development environment 104 of FIG. 1A. The example system 200 may be related to a single tenant, such as tenant 170 of FIG. 1B.

In some instances, when source code is submitted in relation to a software application, an application component, or an application service, the source code can be built into executable artifacts that can be run on different landscapes. The source code can be built through the binary artifact generator 210. In some instances, and based on the technology used for the implementation, the source code can be compiled or interpreted and then built to generate executable binary artifacts. When source code is built, different technologies can be used for the build process.

In some instances, once artifacts are generated from the execution of a successful build operation on the submitted source code at the binary artifact generator 210, an API 230 of a staging service 220 may be invoked to create staging repositories as temporary repositories for uploading of artifacts for evaluation prior productive release. Further, the staging service 220 may be invoked to provide a staging workflow for the built artifacts. Different workflows may be configured for the artifacts. A workflow may define process operations for managing built artifacts from generation of the build, through a testing stage, an evaluation stage, and up until product release stage. The staging workflow may define stage phases and different actions or operations that can be configured to be executed during a stage or in between stages defined as part of the staging workflow.

For example, based on a call to the API 230, three staging repositories, i.e., Repo 237, Repo 238, and Repo 239, may be created as repositories where the built artifacts can be uploaded correspondingly to the multiple repositories. The different repositories, Repo 237, Repo 238, and Repo 239, may be configured to process built artifacts in different manner up until the production release. The built artifacts may be stored at the repositories in correspondence with associated technologies. For example, the built artifacts may be associated with two components of a software application, where each of the components is associated with a different technology and, therefore, a different repository may be associated with built artifacts of different technologies.

In some instances, staging repositories—Repo 237, Repo 238, and Repo 239—may be organized into a staging group 235. The staging group 235 can be created as an object that can act as a parent to the repositories Repo 237, Repo 238, and Repo 239. The staging group 235 can be defined for repositories of a similar type or of repositories of different type.

In some instances, one staging group, such as staging group 235, may be associated with a single repository associated with a single technology for a built workflow execution.

In some instances, when the staging group 235 is created, the staging group inherits one or more staging profiles. A profile may be defined through the staging service 220 for defining behavior of the staging workflow that is to be configured to receive requests for staging of built artifacts. In some instances, more than one profile can be configured for a given staging workflow. Behavior of the staging workflow can be configured through defining profiles as objects stored by the staging service. The one or more profiles are inherited by the staging group and are applied to all of the child repositories—Repo 237, Repo 238, and Repo 239. In such cases, Repo 237, Repo 238, and Repo 239 are configured according to the one or more profiles applied to the staging group 235.

In some instances, based on the defined one or more profiles that are inherited by the staging group 235, the staging process may be configured for releasing artifacts from a staging repository. With a single profile, multiple target repositories can be configured. In such cases, artifacts from a single staging repository, for example, Repo 237, can be configured for release to multiple target repositories.

In accordance with implementations of the present disclosure, when the staging repositories—Repo 237, Repo 238, and Repo 239—are uploaded with content, namely, the built artifacts received from the binary artifact generator 210, the artifacts are populated at the three repositories. Once the artifacts are stored in the repositories, the repositories may be closed for further access and uploading of additional content. For example, each of the repositories may comprise the built artifacts and they may be tested as a set to evaluate performance of the developed software application or component associated with the artifacts.

In some instances, the artifacts at the staging repositories—Repo 237, Repo 238, and Repo 239—are deployed at different landscapes. For example, the staging repositories may be deployed at development landscape 250, and/or may be deployed at a test landscape 252. When the artifacts are executed at the development landscape 250 and the test landscape 252, certain development checks can be performed.

The deployed artifacts may be tested at the development landscape 250 and/or at the test landscape 252, and test results may be provided to the staging service 220 and stored at metadata 240 stored for the staging group 235. For example, a validator 222 may be invoked to validate the initially received built artifacts provided to the staging service 220. Further, a security check 232 may also be executed for the provided artifacts. The security check 232 may be performed based on the metadata stored for the executed artifacts from the staging repositories at the different landscapes, such as, the development landscape 250, the test landscape 252, among others. Result from validation and security testing may be stored at metadata 240. Further integration testing can be executed at the development landscape 250 and/or the test landscape 252. Different tests can be defined for the artifacts that can be configured at the testing phase of the staging workflow that is managed by the staging service 220. The execution of evaluation and testing of the built artifacts as stored in the staging repositories may be configured at the staging workflow that is to be applied for the software product when invoking the staging service 220.

In some instances, when the defined tests are executed, metadata 240 may be evaluated to determine whether the tests had passed successfully. After the tests have passed successfully, the staged content at the repositories can be promoted to a production repository 255. The production repository 255 can be configured for promotion of staged content at the staging service 220. The production repository 255 may be configured as a production repository for promotion of staged artifacts that have passed evaluation and are in production-quality state. In some instances, the production repository 255 may include multiple repositories. In some instances, one staging repository may promote its content to multiple production repositories.

In some instances, the production repository 255 may include a plurality of repositories of different technologies corresponding to the technologies associated with the staging repositories. Further, the production repository 255 may be associated with a corresponding number of target repository for a particular type of a staging repository. In some instances, a profile may be configured for a particular building workflow that is to be executed through the staging repositories at the staging group 235. For example, the staging group 235 may be an extension of the profile, and one staging group may have multiple staging repositories defined associated with different technologies. When a profile is configured, the configuration may define different targets that corresponds to different target repositories with correspondingly different technologies.

The staging profile defined for the staging group 235 may define a corresponding number of target repositories associated with each of the staging repositories. For example, if Repo 237 is associated with a first technology of managing deployment processes, such as MAVEN, then a corresponding target repository defined for releasing artifacts from the Repo 237 may be also associated with that deployment processing technology. Further, it may be defined that for a given staging repository, a specific quantity of target repositories are to be used for promoting the released content. Within the example of Repo 237, it may be defined, at the profile for the staging group 235, that for a single MAVEN staging repository, two target MAVEN repositories (targets) are to be used for uploading the release content in case of successful test results. In such a case, on the promotion step, the staging repository of type MAVEN is promoted to all MAVEN targets defined in the profile. In these scenarios, depending on the profile configuration, a successful build can result in multiple targets for multiple staging repositories.

Once artifacts are promoted to the production repository 255, that is a target repository configured for the staging service 220, the built artifacts can be executed at a production system 260. The artifacts at the production system 260 can be executed in association with other software components or services.

Figure 2B:
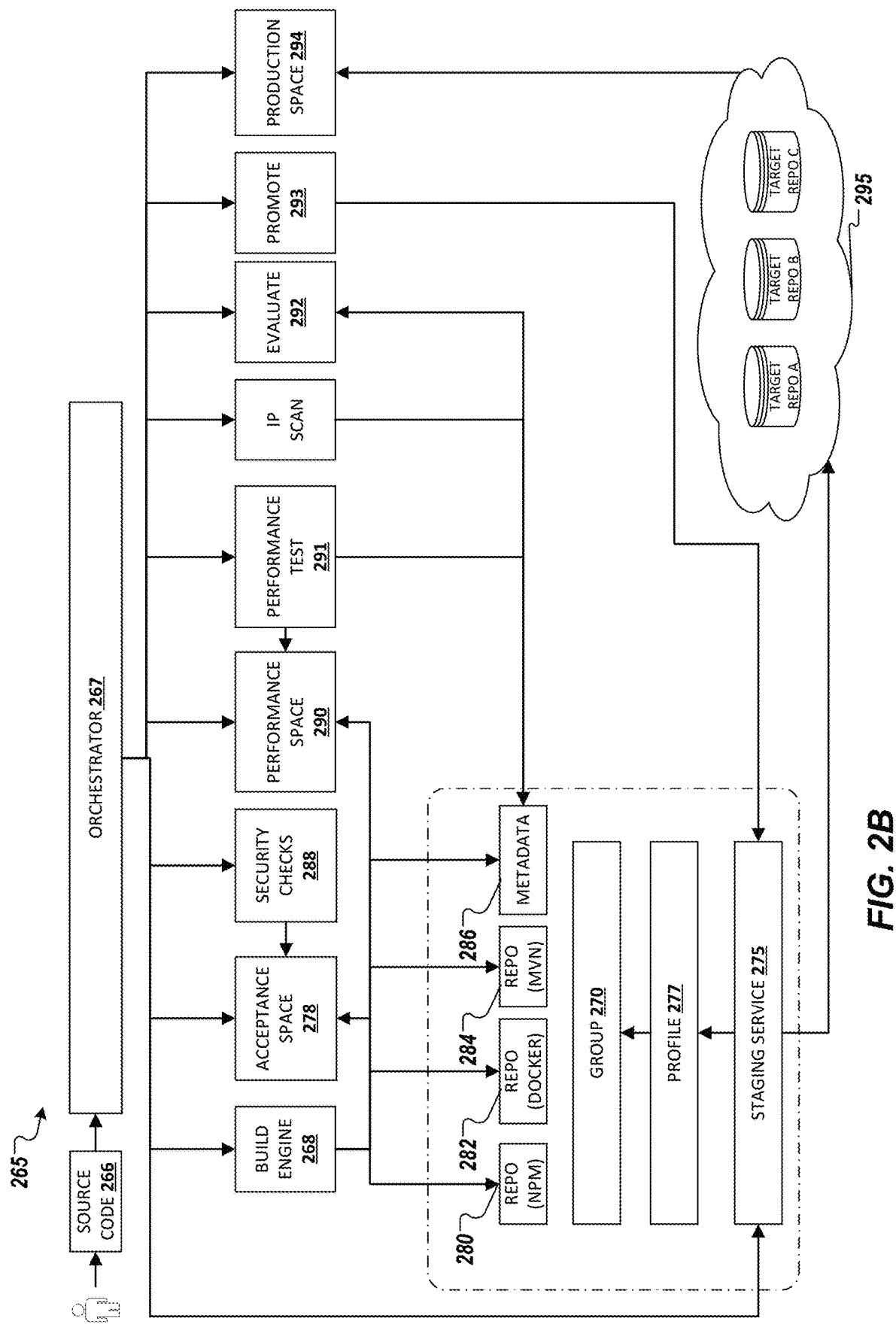
FIG. 2B is a block diagram for an example system for uploading, deploying, and evaluating artifacts through staging repositories in accordance with implementations of the present disclosure.

FIG. 2B is a block diagram for an example system 265 for uploading, deploying and evaluating artifacts through staging repositories in accordance with implementations of the present disclosure.

In some instances, source code 266 is submitted in relation to a software application, an application component, or an application service, to an orchestrator 267. The orchestrator 267 may be configured to receive requests in relation to submitted source code and dispatch these requests to a staging service 275 to execute a staging workflow set up for the particular request. For example, the configuration may be related to evaluation of the software application, component(s), service(s), other.

In some instances, the source code 266 is submitted for a software application that includes components associated with different technologies, where the source code related to the particular components may be built through different techniques and/or tools. As the source code 266 is in relation to a single software application and/or multiple components that are defined to work together and provide functionality, the source code 266 may be evaluated to determine whether requirements of the software application are fulfilled.

In some instances, the evaluation of the software application defined by the submitted source code 266 may be associated with different evaluation stages that may be related to executing the source code 266 at different environments and performing different evaluation operations, checks, and scans, among others. During such evaluations, the developed software application may be analyzed to determine whether further updates on the source code are needed before release in the production environment.

In some instances, the source code 266 can be built into executable artifacts that can be run on different landscapes, as discussed for the source code in relation to FIG. 2A. The source code 266 can be built through a binary artifact generator or a build engine provided through the orchestrator 267. In some instances, and based on the technology used for the implementation, the source code 266 can be compiled or interpreted and then built to generate executable binary artifacts. When source code 266 is built, different technologies can be used for the build process.

In some instances, when the source code 266 is provided to the orchestrator 267, a staging workflow can be set up and built artifacts can be generated and stored at different staging repositories as discussed in relation to FIG. 2A. The provided source code 266 to the orchestrator 267 may be built at a build engine 268 and the built artifacts can be uploaded to staging repositories provisioned by invoking the staging service 275. For example, the staging repositories, i.e., Repo 280, Repo 282, and Repo 284, may be created as repositories where the built artifacts can be uploaded correspondingly to the different technologies. For example, built artifacts for one component may be associated with one technology for managing built artifacts, such as MAVEN, and these artifacts may be stored at Repo 284 that corresponds to MAVEN. The built artifacts may be stored at the repositories in correspondence with associated technologies. For example, the built artifacts may be associated with two components of a software application, where each of the components is associated with a different technology and therefore, a different repository may be associated with built artifacts of different technologies.

In some instances, the orchestrator 267 can call the staging service 275, for example, through invoking an API of the staging service 275 to create staging repositories as temporary repositories for uploading of artifacts for evaluation prior productive release. The staging service 275 may be similar to the staging service 200 of FIG. 2A, and may be invoked to provide a staging workflow for the built artifacts generated based on the source code 266.

Different workflows may be configured for the artifacts. A workflow may define process operations for managing built artifacts from the generation of the build, through a testing stage, an evaluation stage, and up until product release stage. The staging workflow may define stage phases and different actions or operations that can be configured to be executed during a stage or in between stages defined as part of the staging workflow.

In some instances, the staging service 275 may support definition of a profile 277 for the staging workflow. The profile 277 may correspond to the profile (or profiles) configured for the staging group 235 of FIG. 2A. A profile 277 may be defined through the staging service 275 for configuring a behavior of the staging workflow to receive requests for staging of built artifacts. In some instances, the profile 277 may be maintained and changed through functionality and interfaces provided by the staging service 275. In some instances, when a group 270 is created, the group 270 inherits one or more staging profiles, such as the profile 277. In some instances, more than one profile can be configured for a given staging workflow. Behavior of the staging workflow can be configured through defining profiles as objects stored by the staging service 275. The one or more profiles are inherited by the group 270 and are applied to all of the child repositories, e.g., Repo 280, Repo 282, and Repo 284. In such cases, the staging repositories are configured according to the profile 277 applied to the group 270. A group such as group 270 may be associated with a single repository (not shown) associated with a single technology for a built workflow execution, rather than with multiple ones as described herein. In some instances, the group 270 combines a plurality of technologies associated with building artifacts to be maintained at the staging technologies.

In some instances, based on the defined one or more profiles that are inherited by the group 270, the staging process may be configured for releasing artifacts from a staging repository. With a single profile, multiple target repositories can be configured. In such cases, artifacts from a single staging repository, for example, Repo 280, can be configured for release to multiple target repositories from the target repositories 295. The staging profile 277 may be defined for the staging group 270 and may define a corresponding number of target repositories as release repositories associated with each of the staging repositories, as described in relation to staging group 235 of FIG. 2A. The release repositories may be set up as external repositories maintained at a customer landscape.

For example, the staging workflow may define that the uploaded artifacts from the staging repositories, Repo 280, 282, and 284, are deployed in an acceptance space 278 where security checks 288 are executed. For example, during acceptance testing versions of different components to which the artifacts belong within a software application may be evaluated and compared. Further, the staging workflow may define that the uploaded artifacts from the staging repositories are deployed in a performance space 290 where performance test 291 is executed. Further, an intellectual property (IP) scan can be executed for the uploaded artifacts. The IP scan can be associated with evaluating metadata 286 for the artifacts stored at the staging repositories.

In accordance with implementations of the present disclosure, when the staging repositories—Repo 280, Repo 282, and Repo 284—are uploaded with content, namely, the built artifacts received from the build engine 268, the artifacts are populated at the three repositories. Once the artifacts are stored in the repositories, the repositories may be closed for further access and uploading of additional content. Each of the repositories may contain the built artifacts. The built artifacts may be tested as a set to evaluate performance of the developed software application or component associated with the artifacts. For example, the built artifacts from the repositories may be deployed at an acceptance space 278 providing infrastructure for running the artifacts and executing the security checks to perform security test evaluation. Further, the built artifacts may be deployed at a performance space 290 and evaluated according to performance test 291. Based on executed performance evaluations of the built artifacts stored at the staging repositories, metadata 286 can be created to store information about the artifacts and their performance, such as associated conditions, limitations, errors, warnings, among others. Further, the metadata 286 may include versioning details for the artifacts and for the software application or components they correspond to.

In some instances, the metadata 286 may be evaluated 292 according to a provided evaluation criteria for the staging workflow. The deployed artifacts at a given space, such as the acceptance space, the performance space, and others, may be tested and evaluation results may be provided to the staging service 275 and stored at metadata 286 stored for the staging group 270. Results from different testing, validation, and evaluation may be stored at metadata 240.

In some instances, integration testing can be executed at the performance space 290, as the performance test 291 may include an integration test executed for the running artifacts from all of the repositories to determine compliance between artifacts built and maintained through different technologies. For example, when source code 266 includes developed code for different components that are built through different technologies, and the built artifacts are stored at separate staging repositories created by the staging service 275, an integration testing is executed over the running software deployed through installing the artifacts at the different repositories to determine continuous execution. Different tests can be defined for the artifacts that can be configured at a testing phase of the staging workflow that is managed by the staging service 275. The execution of evaluation and testing of the built artifacts may be configured at the staging workflow that is to be applied for the software product when invoking the staging service 275.

In some instances, when the defined tests are executed, metadata 286 may be evaluated 292 to determine whether the evaluation had passed successfully, and whether the built artifacts from the staging repositories (i.e., Repo 280, 282 and 284) can be promoted 293. After the evaluations have passed successfully, the staged content at the repositories can be promoted 293 to a production repository 295, which can, in some instances, include multiple repositories. In some instances, one staging repository may release its content to multiple production repositories.

In some instances, the production repository 295 may include a plurality of repositories of different technologies corresponding to the technologies associated with the staging repositories. Further, the production repository 295 may be associated with a corresponding number of target repository for a particular type of a staging repository.

For example, once artifacts are released to the production repository 295 at the corresponding target repository to the staging repository where the artifacts were initially stored, the built artifacts can be executed at a production space 295, where they can be executed in association with other software components or services.

Figure 3:
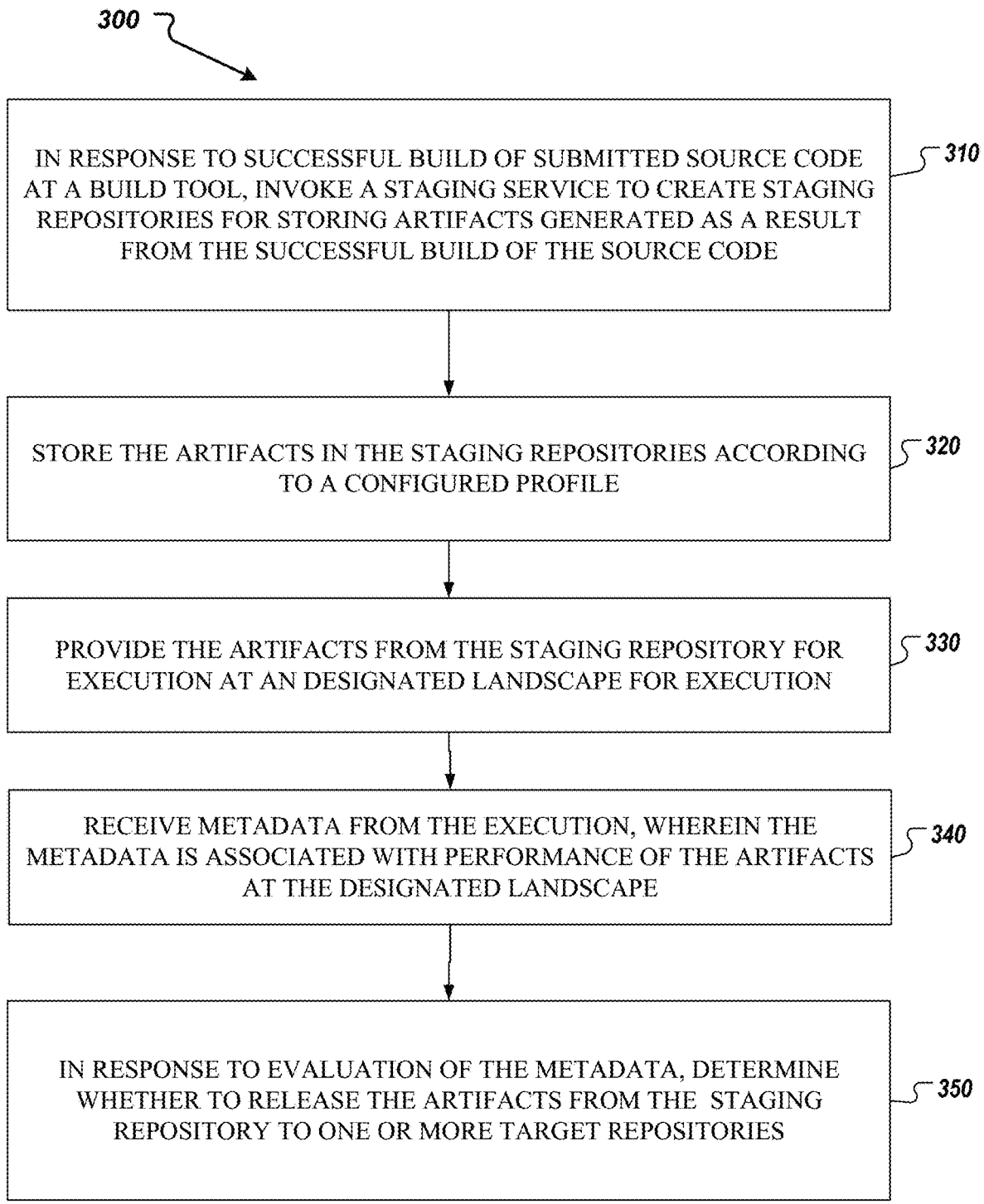
FIG. 3 is a flowchart for an example method for creating staging repositories for deploying built artifacts for execution at testing environments in accordance with implementations of the present disclosure.

FIG. 3 is a flowchart for an example method 300 for creating staging repositories for deploying built artifacts for execution at testing environments in accordance with implementations of the present disclosure. The method 300 can be executed at a computer system, such as system 200 of FIG. 2A, system 265 of FIG. 2B.

At 310, in response to successful compilation of submitted source code at a build tool, a staging service is invoked. In response to invoking the staging service, staging repositories are created for storing artifacts generated as a result from the successful build of the source code.

In some instances, the submitted source code may be related to a first version of a software component that is developed for delivery at a plurality of customer landscapes. In some instances, the submitted source code may be or may include changes to source code of a previous version of the software component, for example, a beta pre-release version.

In some instances, changes to source code developed for a software application component may be submitted to a compiler for compiling the source code and then building the compiled source code, including the changes, to generate binary artifacts. The binary artifacts may be uploaded into staging repositories, where the repositories may be associated with different deployment management technologies. For example, the built artifacts associated with the software application component can be uploaded separately at different repositories, so that the different staging repositories may maintain all of the artifacts according to a corresponding different technology. For example, there may be a MAVEN staging repository, a DOCKER staging repository, an NPM staging repository, or other staging repositories related to different technologies for maintaining artifacts of a single product release.

In some instances, a profile may be configured for the staging repositories to manage processing of the artifacts. For example, the profile may be configured in relation to the delivery process of the artifacts at different target landscape for the customer. Further, the profile may be configured to define specifics for the instantiation of the staging repositories and the underlying technology structure for managing delivery and maintenance of artifacts.

In some instances, a profile may be defined as a staging profile in an object stored at the staging service. For example, the profile can be generated by an administrator of the development lifecycle. The profile may be associated with authorization permissions for the profile definition. Therefore, the profile may be defined by an end user who is authorized to perform profile definitions. In some instances, the staging service 220 may expose a user interface for defining a profile for configuration of a staging repository and/or a group of staging repositories.

In some instances, the profile may define multiple staging target repositories for releasing artifacts that are approved for release to productive landscapes. The profile may also define actions for execution over the artifacts as stored in the staging repositories. Further, the profile may define how long a repository storing artifacts that are determined to be unsuccessful during test execution has to be maintained and keep the artifacts stored after test result evaluations.

At 320, the artifacts are stored (or uploaded) in the staging repositories according to the configured profile. The staging repositories may be such as the staging repositories described in relation to FIG. 1A, FIG. 2A and FIG. 2B.

In some instances, each of the staging repositories may be associated with a different technology for management of deployed artifacts. In those instances, as the artifacts are stored at corresponding different repositories, the artifacts can be managed according to the different technologies.

In accordance with implementations of the present disclosure, when a new staging repository is initially created, it may be set to an open mode. Once in open mode, the repository can receive uploaded artifacts. Artifacts generated from a built procedure can be uploaded to the repository while it is still in open mode. When an uploading process for artifacts is completed, the repository may be switched to closed mode. The closed mode may ensure that the content in the repository stays unchanged. In some instances, there may be actions that can be configured to be automatically executed before or after the repository is closed.

At 330, the artifacts from the staging repository are provided for execution at a designated landscape for execution.

In some instances, the designated landscape may be a testing landscape for execution of different tests over the running built artifacts, such as, unit testing, or integration testing of components including artifacts built with different technologies.

In some instances, once the artifacts are stored at the staging repositories, the uploading process can be finished and the repositories may be switched to a closed mode, with the finish and/or switch triggering automatic execution of operations performed in relation to the running artifacts. For example, operations such as validation, evaluation, or testing processing can be performed over the running artifacts in the designated landscape.

In some examples, the artifacts from the staging repositories may be provided for deployment at a development landscape, and/or may be provided deployment at a test landscape. The deployment from the staging repositories to different landscapes and the performing of different validations or testing checks or operations can be configured to be performed as discussed in relation to system 200 of FIG. 2A and systems 265 of FIG. 2B.

In some instances, when a repository is set to a closed mode, the stored artifacts can be deployed at a given landscape and testing can be performed. The artifacts can be defined as release candidates for a productive deployment that are configured for testing according to different testing scenarios and checks as defined for the development lifecycle of the software application.

At 340, metadata from the test execution is received. The metadata is associated with performance of the artifacts at the designated landscape.

Based on evaluation of the execution of the artifacts within the designated landscape and execution scenarios, such as different types of testing, the metadata generated from the executions, such as test results, may be evaluated to determine whether the artifacts in the staging repositories can be released or promoted to a productive repository associated with a productive landscape for productive execution. If the testing results are evaluated and it is determined that they do not qualify for a productive release, the staging repositories can be dropped. For example, based on the received testing results, a new version of the submitted source code can be developed and provided for a subsequent build and staging at staging repositories created by the staging service.

At 350, in response to evaluation of the metadata, a determination is made as to whether the artifacts are to be released from the staging repositories to one or more target repositories.

In some instances, if test results are satisfactory for the test execution of the artifacts that are stored at the staging repositories, the artifacts from the repositories may be released and all the content of the repositories may be copied from the staging repositories to one or more target repositories. The target repositories may be determined based on evaluation of the profile. For example, the profile may include a definition of a target repository for releasing of the artifacts when results from testing are successful.

In some instances, actions or operations to be performed on the artifacts in corresponding repositories can be configured for execution. Such actions may be executed before or after the artifacts are promoted to a target repository as defined in the profile.

In some instances, if it is determined based on the test results that a repository is to be dropped (e.g., erased from memory), a period of time for keeping the repository "alive" and maintaining the storage of artifacts in the repository can be configured. For example, such configuration may be executed based on a definition of such a period, e.g., "Time To Live," via the profile.

In some instances, when it is determined that the artifacts comply with a criteria for successful test evaluation based on the metadata, the artifacts may be released to a target repository, for example, a customer infrastructure. The released artifacts can be executed at a production runtime environment part of a customer production landscape.

Figure 4:
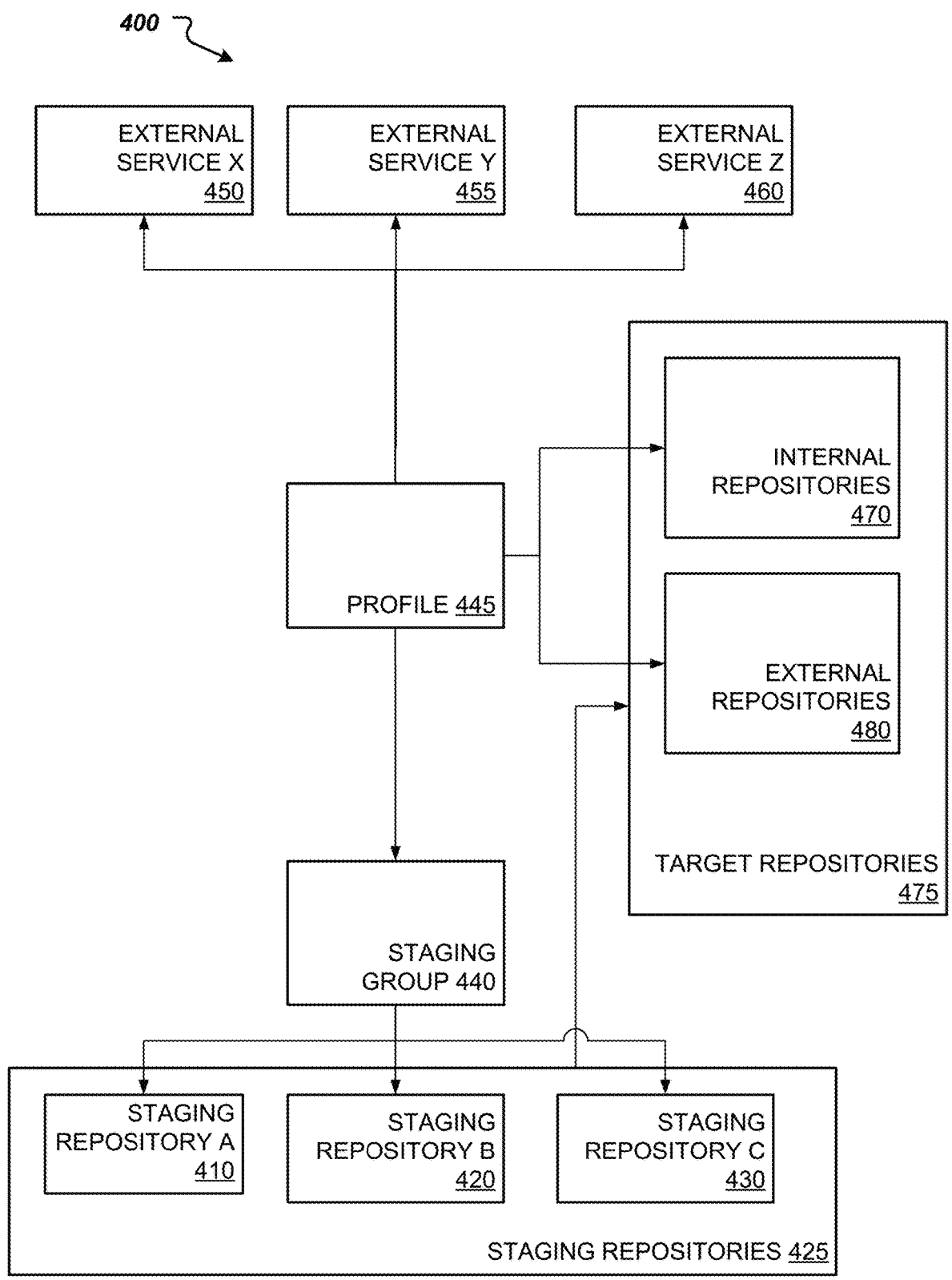
FIG. 4 is a block diagram for an example system for creating a staging group for staging repositories in accordance with implementations of the present disclosure.

FIG. 4 is a block diagram for an example system 400 for creating a staging group for staging repositories in accordance with implementations of the present disclosure.

In some instances, the example system 400 may be provided with a staging service (not shown) that provides configuration of a staging workflow via profiles, such as profile 445. For example, the staging service used for defining profile 445 may be such as the staging service 115 of FIG. 1A, the staging service 220 of FIG. 2A, the staging service 275 of FIG. 2B, and the invoked staging service in relation to FIG. 3.

The profile 445 may be configured to define specifics for the instantiation of staging repositories, such as staging repository A 410, staging repository B 420, and staging repository C 430. The profile 445 may define the underlying technology structure for managing delivery and maintenance of artifacts at the different staging repositories.

In some instances, the profile 445 may be defined as a staging profile in an object stored at the staging service. For example, the profile 445 can be defined by an administrator of the development lifecycle and can correspond to a configured staging workflow defined for a particular build process. The profile 445 may be associated with authorization permissions for different users and authorized operations for the different users. Through the profile 445, a configuration for a certain user may be provided defining access to certain technologies for creating staging repositories. Further, through the profile 445, a configuration for the target repositories corresponding to the staging repositories for promoting artifacts may be defined. The profile 445 may define mappings between the staging repositories associated with the staging group 440 and one or more repositories from the target repositories 475. In some instances, the target repositories 475, such as the common repository 150 of FIG. 1A, or may be release repositories that are instantiated at an external landscape, for example, managed by a customer.

For example, the target repositories 475 may include repositories that are stored at different infrastructures, including internal repositories 470 and external repositories 480. The target repositories 475 may be instantiated at cloud infrastructure and may be maintained in relation to internal product release of a software provided related to a software component built through a staging process as configured at the profile 445. Such internal products can be the production repository 255 of FIG. 2A and may be maintained as internal repositories 470. Further, there may be external repositories 480 maintaining built artifacts in association to customer product releases, where artifacts released at the external repositories 480 may be executed at external infrastructure associated with different security and hardware requirements. The external repositories 480 may be the release repositories 295.

In some instances, the profile 445 may be instantiated by a staging group 440, where the staging group 440 may include one or more technologies defined for one or more repositories, as defined in the profile 445.

In some instances, the profile 445 may include configuration for invoking external services, such as external service X 450, external service Y 455, and external service Z 460 for performing external checks that can be executed as part of a defined staging workflow. For example, such a service may execute checks on images built from artifacts in a DOCKER related repository. In the current example, the confirmation may cause a check of whether the DOCKER image is larger than 200 MB, with the check being integrated as an external check associated with the staging service and used by the profile 445.

In some instances, when a staging service is invoked, a profile 445 is configured and staging group 440 is defined as a parent for three staging repositories 425—staging repository A 410, staging repository B 420, and staging repository C 430—checks can be performed over the built artifacts stored at the staging repositories based on invoking the external services for performing external checks, illustrated as external service X 450, external service Y 455, and external service Z 460. Further checks, such as validation of built artifacts, integration tests, security checks, and others, can be executed. Based on the executed checks, it may be determined whether to release (or promote) the artifacts from the three staging repositories 425 to one or more repositories, such as target repositories 475.

For example, a staging workflow can be configured by the staging service through the profile 445, where two different technologies for managing built artifacts can be defined for two different staging repositories. In such cases, when the staging workflow is executed and the staging service API is invoked, two staging repositories are to be created to correspond to the two different staging repositories. Further, the profile 445 may be defined to provide a correspondence between the staging repository Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device, such as a CRT (cathode ray tube) or LCD (liquid crystal display) monitor for displaying information to the user and a keyboard and a pointing device, such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication, such as a communication network. Examples of communication networks include a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method, the method comprising:
   in response to an indication of a successful build of submitted source code at a build tool, invoking a staging service to create a plurality of staging repositories for storing artifacts generated as a result of the successful build of the submitted source code, wherein a profile is configured for the plurality of staging repositories to manage processing of the artifacts, wherein the submitted source code is associated with a software application including a set of components;
   uploading the artifacts in the plurality of staging repositories according to the configured profile, wherein the plurality of staging repositories store corresponding sets of artifacts from the generated artifacts from the successful build, wherein each set of artifacts corresponds to a component of the set of components of the software application, and wherein each of the plurality of staging repositories is associated with a different deployment management technology for managing corresponding sets of the artifacts;
   providing the artifacts from the plurality of staging repositories for execution at a designated landscape;
   receiving metadata from the execution, wherein the metadata is associated with performance of the artifacts at the designated landscape; and
   in response to evaluation of the metadata, determining whether to release the artifacts from a first staging repository of the plurality of staging repositories to one or more target repositories.

2. The method of claim 1, further comprising:
   in response to releasing the artifacts to the one or more target repositories, deploying the artifacts to a production landscape.

3. The method of claim 1, further comprising:
   receiving, at a compiler, changes submitted for the source code, wherein the source code with the changes is submitted for compiling, wherein the source code and the changes are associated with a version of the software application; and
   building, at the build tool, the compiled source code with the changes for the software application to generate the artifacts and to provide the indication of the successful build.

4. The method of claim 1, further comprising:
   configuring a staging group based on the profile; and
   assigning the plurality of staging repositories to the staging group to define corresponding deployment management technologies associated with the plurality of staging repositories.

5. The method of claim 4, further comprising:
   after uploading the artifacts at the plurality of staging repositories, locking the plurality of staging repositories in the staging group for read-only operations; and
   executing checks for the artifacts to determine integrity of content of the artifacts according to predefined actions associated with the configured profile.

6. The method of claim 1, further comprising:
   instantiating the staging service to create the plurality of staging repositories as temporary repositories for storing the artifacts.

7. The method of claim 6, wherein instantiating the staging service comprises:
   based on exposed service functionality through a staging interface of the staging service, receiving a profile definition for the profile to be configured for the plurality of staging repositories.

8. The method of claim 1, further comprising:
   releasing the artifacts from the plurality of staging repositories to the one or more target repositories, wherein a quantity of target repositories is defined in the configured profile, and wherein a first staging repository from the staging repositories is defined for release into a plurality of target repositories.

9. A non-transitory, computer-readable medium coupled to one or more processors and having instructions stored thereon which, when executed by the one or more processors, cause the one or more processors to perform operations, the operations comprising:
   in response to an indication of a successful build of submitted source code at a build tool, invoking a staging service to create a plurality of staging repositories for storing artifacts generated as a result of the successful build of the submitted source code, wherein a profile is configured for the plurality of staging repositories to manage processing of the artifacts, wherein the submitted source code is associated with a software application including a set of components;

uploading the artifacts in the plurality of staging repositories according to the configured profile, wherein the plurality of staging repositories store corresponding sets of artifacts from the generated artifacts from the successful build, wherein each set of artifacts corresponds to a component of the set of components of the software application, and wherein each of the plurality of staging repositories is associated with a different deployment management technology for managing corresponding sets of the artifacts;

providing the artifacts from the plurality of staging repositories for execution at a designated landscape;

receiving metadata from the execution, wherein the metadata is associated with performance of the artifacts at the designated landscape; and in response to evaluation of the metadata, determining whether to release the artifacts from a first staging repository of the plurality of staging repositories to one or more target repositories.

10. The computer-readable medium of claim 9, wherein the operations further comprise:

in response to releasing the artifacts to the one or more target repositories, deploying the artifacts to a production landscape.

11. The computer-readable medium of claim 9, wherein the operations further comprise:

receiving, at a compiler, changes submitted for the source code, wherein the source code with the changes is submitted for compiling, wherein the source code and the changes are associated with a version of the software application; and building, at the build tool, the compiled source code with the changes for the software application to generate the artifacts and to provide the indication of the successful build.

12. The computer-readable medium of claim 9, wherein the operations further comprise:

configuring a staging group based on the profile;

assigning the plurality of staging repositories to the staging group to define corresponding deployment management technologies associated with the plurality of staging repositories;

after uploading the artifacts at the plurality of staging repositories, locking the plurality of staging repositories in the staging group for read-only operations; and executing checks for the artifacts to determine integrity of content of the artifacts according to predefined actions associated with the configured profile.

13. The computer-readable medium of claim 9, wherein the operations further comprise:

instantiating the staging service to create the plurality of staging repositories as temporary repositories for storing the artifacts, wherein instantiating the staging service comprises:

based on exposed service functionality through a staging interface of the staging service, receiving a profile definition for the profile to be configured for the plurality of staging repositories; and releasing the artifacts from the staging repositories to the one or more target repositories, wherein a quantity of target repositories is defined in the configured profile, and wherein a first staging repository from the staging repositories is defined for release into a plurality of target repositories.

14. A system comprising
a computing device; and
a computer-readable storage device coupled to the computing device and having instructions stored thereon which, when executed by the computing device, cause the computing device to perform operations, the operations comprising:

in response to an indication of a successful build of submitted source code at a build tool, invoking a staging service to create a plurality of staging repositories for storing artifacts generated as a result of the successful build of the submitted source code, wherein a profile is configured for the plurality of staging repositories to manage processing of the artifacts, wherein the submitted source code is associated with a software application including a set of components;

uploading the artifacts in the plurality of staging repositories according to the configured profile, wherein the plurality of staging repositories store corresponding sets of artifacts from the generated artifacts from the successful build, wherein each set of artifacts corresponds to a component of the set of components of the software application, and wherein each of the plurality of staging repositories is associated with a different deployment management technology for managing corresponding sets of the artifacts;

providing the artifacts from the plurality of staging repositories for execution at a designated landscape;

receiving metadata from the execution, wherein the metadata is associated with performance of the artifacts at the designated landscape; and in response to evaluation of the metadata, determining whether to release the artifacts from a first staging repository of the plurality of staging repositories to one or more target repositories.

15. The system of claim 14, wherein the operations further comprise:

in response to releasing the artifacts to the one or more target repositories, deploying the artifacts to a production landscape.

16. The system of claim 14, wherein the operations further comprise:

receiving, at a compiler, changes submitted for the source code, wherein the source code with the changes is submitted for compiling, wherein the source code and the changes are associated with a version of the software application; and building, at the build tool, the compiled source code with the changes for the software application to generate the artifacts and to provide the indication of the successful build.

17. The system of claim 14, wherein the operations further comprise:

configuring a staging group based on the profile;

assigning the plurality of staging repositories to the staging group to define corresponding deployment management technologies associated with the plurality of staging repositories;

after uploading the artifacts at the plurality of staging repositories, locking the plurality of staging repositories in the staging group for read-only operations; and executing checks for the artifacts to determine integrity of content of the artifacts according to predefined actions associated with the configured profile.

18. The system of claim 14, wherein the operations further comprise:
   instantiating the staging service to create the plurality of staging repositories as temporary repositories for storing the artifacts, wherein instantiating the staging service comprises:
      based on exposed service functionality through a staging interface of the staging service, receiving a profile definition for the profile to be configured for the plurality of staging repositories.

19. The system of claim 14, wherein the operations further comprise:
   releasing the artifacts from the staging repositories to the one or more target repositories, wherein a quantity of target repositories is defined in the configured profile, and wherein a first staging repository from the staging repositories is defined for release into a plurality of target repositories.

* * * * *